March 18, 1930.  P. R. SEAMON  1,751,219
ELECTRIC BROILER
Filed Oct. 26, 1928
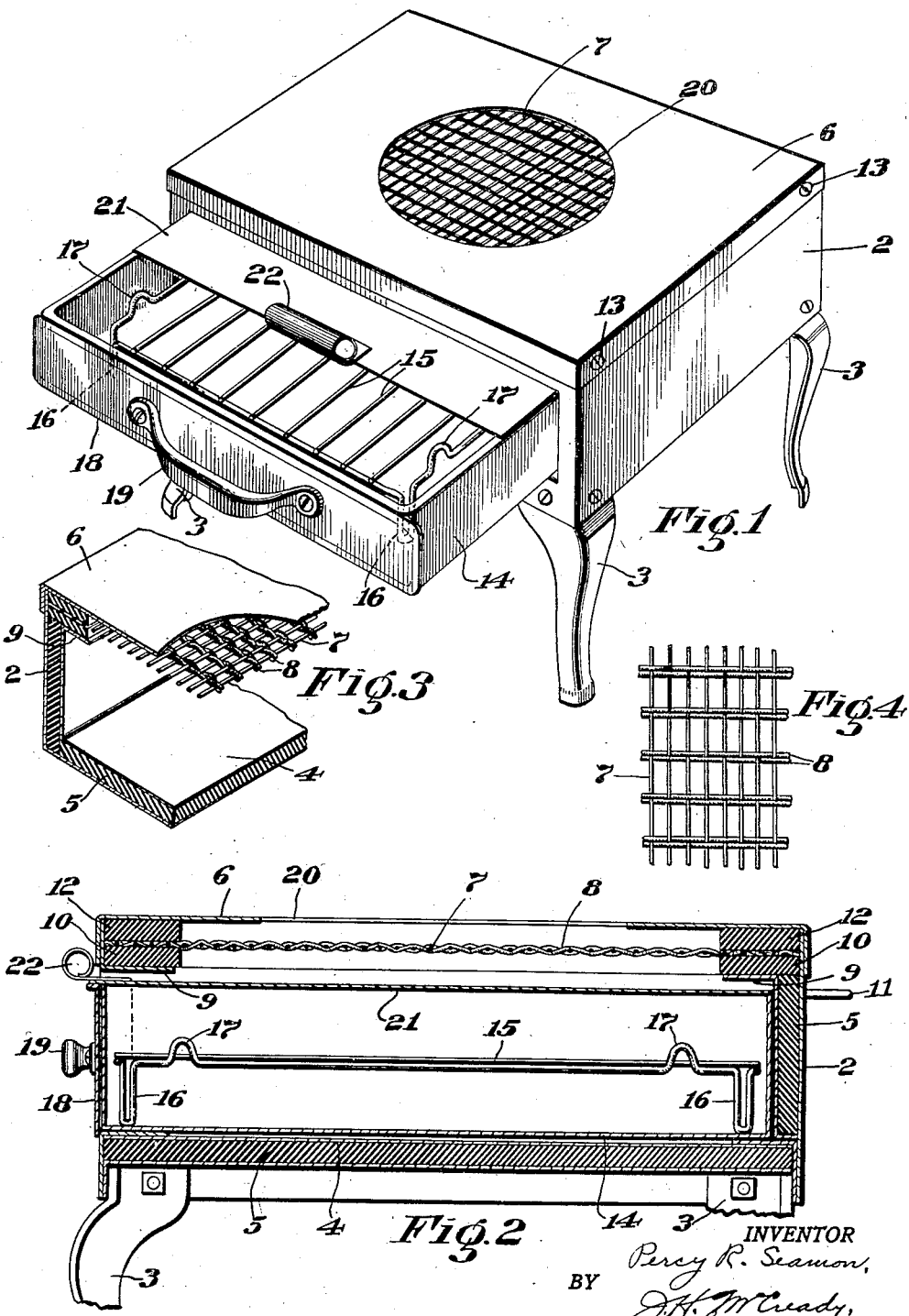
INVENTOR
Percy R. Seamon,
BY J. H. M'Cready,
his ATTORNEY Patented Mar. 18, 1930

1,751,219

UNITED STATES PATENT OFFICE

PERCY R. SEAMON, OF CAMBRIDGE, MASSACHUSETTS, ASSIGNOR TO FLORENCE STOVE COMPANY, OF BOSTON, MASSACHUSETTS, A CORPORATION OF MASSACHUSETTS

ELECTRIC BROILER

Application filed October 26, 1928. Serial No. 315,278.

This invention relates to electric cooking apparatus of the type designed more especially for broiling, frying, and the like.

It is the chief object of the invention to devise an apparatus of this character which can be manufactured economically, will be simple and compact in construction, convenient to use, and which will be highly efficient.

The nature of the invention will be readily understood from the following description when read in connection with the accompanying drawings, and the novel features will be particularly pointed out in the appended claims.

In the drawings,

Figure 1 is an angular view of a broiler constructed in accordance with this invention;

Fig. 2 is a longitudinal vertical view of the broiler shown in Fig. 1;

Fig. 3 is an angular cross-sectional view illustrating certain details of construction; and Fig. 4 is a plan view of a portion of the heating unit which preferably is used.

The broiler shown comprises a body portion or casing 2 supported on legs 3. The casing includes both an outer sheet metal shell and also a lining 4 of sheet metal spaced from the shell, a heat insulating medium 5 such as asbestos, magnesia, or the like, being interposed between the sheet metal parts. Preferably the top 6 of the casing is made smooth and flat so as to provide a convenient support for a frying pan or other utensil in which the food to be cooked is contained.

Mounted in the upper part of the casing 2 is an electric heating unit 7 which may be of any suitable form. I prefer, however, to use a unit in which the conducting wires are arranged parallel with each other and all located in a common plane. The wires may conveniently be held in spaced relationship by interweaving strands 8 of asbestos yarn with the wires, as clearly shown in the drawings. In order to support this unit in its operative position I prefer to bend the upper edges of the metal lining 4 inwardly to form a marginal flange 9, and to clamp the marginal portions of the unit 7 between upper and lower insulating pieces 10 and 12, the lower piece 10 resting on the flange 9 while the upper piece 12 is held in place by the marginal portion of the top 6. Screws, two of which are shown in Fig. 1 at 13, hold the top 6 to the side members of the casing 2. This construction provides a unit which extends substantially across the entire area of the casing and which occupies very narrow vertical dimensions. The conductors 7 are connected in series and their ends are electrically connected to two terminal studs which project from the back of the broiler, one of these studs being shown in Fig. 2 at 11.

As clearly shown in the drawings, a chamber is provided in the casing 2 immediately below the unit 7 and a tray 14 is slidably supported in this chamber. This tray is designed to hold the meat, fish, or other food to be broiled, the food being supported on a grid 15. It is of advantage to provide means for supporting the grid at different distances from the heating unit 7, and in the construction shown this is conveniently accomplished by providing the grid with legs 16 which extend from one side thereof and shorter legs 17 extending from the opposite side. Consequently, when the grid is turned over so that the legs 17 rest on the bottom of the tray 14 it will be spaced somewhat further from the heating unit than when it is in the position shown in Figs. 1 and 2.

The tray also is provided with a false front 18 to which the handle 19 is secured, the false front being spaced from, but fastened to, the real front of the tray. This construction prevents the handle and false front from becoming too highly heated since the spacing of the part 18 from the tray greatly reduces the rate of transfer of heat from the latter to the former. The ends and lower edge of the false front also project beyond the corresponding portions of the tray so that it will substantially close the front or opening of the chamber when the tray is in the casing.

It is contemplated that the device may be used either for broiling, in which case the meat, fish, or the like, will be placed in the tray 14, or for frying, boiling, or the like, in which case the utensil containing the food will be placed on the top of the broiler, the top 6 having a relatively large aperture 20 through it to expose the heating unit. I have found that the efficiency of the apparatus can be improved very substantially in either method of cooking by the use of a device for reflecting the heat either upwardly or downwardly, as desired. To this end I have provided a plate-like slide 21 having a handle 22, the slide being of such dimensions that it will substantially cover the top of the tray and will fit between the tray and the heating unit 7. The slide is used in this position when cooking on top of the broiler, and it serves at this time to reflect the heat upwardly. When the apparatus is used for broiling, the slide is removed from the position shown in Figs. 1 and 2 and is placed on top of the casing 6 where it cooperates with the casing in reflecting the heat downwardly.

It will now be appreciated that the invention provides a relatively simple form of broiler which can be manufactured economically, is adapted for a wide variety of uses, and which is exceptionally efficient. The use of the reflecting plate 21 substantially reduces the time required to cook a given quantity of food.

While I have herein shown and described a preferred embodiment of my invention, it will be understood that the invention may be embodied in other forms without departing from the spirit or scope thereof.

Having thus described my invention, what I desire to claim as new is:

1. In a broiler, the combination of a casing, a horizontal electric heating unit supported in said casing and extending across the greater part of the area of the casing, said casing having a chamber therein immediately below said unit, a tray slidable into and out of said chamber, and means adjustable to reflect the heat from said unit either upward or downward, as desired.

2. In a broiler, the combination of a heat insulating casing, legs supporting said casing, said casing including a flat apertured top adapted to support a frying pan or the like, an electric heating unit supported horizontally in the upper part of said casing immediately below said top, the conducting wires of said unit being located substantially in a common horizontal plane, said casing having a chamber therein immediately below said unit, a tray slidably mounted in said chamber, and a plate-like slide removably fitting in said casing between said tray and said unit.

3. In a broiler, the combination of a casing, a horizontal electric heating unit supported in said casing and extending across the greater part of the area of the casing, said casing having a chamber therein immediately below said unit, a tray slidable into and out of said chamber, a grid in said tray for supporting food to be broiled, and means for supporting said grid at different distances from said heating unit.

4. In a broiler, the combination of a casing having heat insulating walls, a horizontal electric heating unit supported in said casing and extending across the greater part of the area of the casing, said casing including a top immediately below which said unit is mounted and which serves to protect said unit, the casing also having a chamber therein immediately below said unit and partly surrounded by said heat insulating walls, a tray slidably mounted in said chamber and provided with a front adapted to substantially close the opening at the front of the chamber, the top of said casing being apertured to expose said unit, and a reflector plate removably fitting in said casing between said tray and unit.

5. In a broiler, the combination of a casing, a horizontal electric heating unit supported in said casing and extending across the greater part of the area of the casing, said casing having a chamber therein immediately below said unit, a tray slidable into and out of said chamber, and a grid in said tray for supporting food to be broiled, said grid having legs projecting from opposite sides thereof, the legs on one side being longer than those on the other whereby one set of legs is adapted to support the grid at a shorter distance above the bottom of the tray than the other set.

PERCY R. SEAMON.